United States Patent [19]

Sherman et al.

[11] Patent Number: 4,913,040
[45] Date of Patent: Apr. 3, 1990

[54] APPARATUS FOR COOKING FOOD

[76] Inventors: Victor Sherman, 13-10 34 Ave., Lic, N.Y.; Wladimir Kowalenko, 24 Whitney Cir., Glen Cove, N.Y.; Ilya Zborovsky, 6 Schoolhouse Way, Dix Hills, N.Y.; William Sanchez, 35-69 169 Ave., Flushing, N.Y.

[21] Appl. No.: 221,111
[22] Filed: Jul. 19, 1988
[51] Int. Cl.⁴ .................. A47J 37/06; A47J 43/18
[52] U.S. Cl. ......................... 99/372; 99/377; 99/379; 99/349; 99/351
[58] Field of Search .............. 99/349, 351, 372, 375, 99/377, 379, 380, 381

[56] References Cited

U.S. PATENT DOCUMENTS

| 721,455 | 2/1903 | MacKenzie | 99/372 |
| 1,512,674 | 10/1924 | Campbell | 99/372 X |
| 1,706,612 | 3/1929 | Jaeger | 99/375 |
| 2,009,791 | 7/1935 | Schroyer | 99/377 |
| 2,788,427 | 4/1957 | Fresone et al. | 99/349 X |
| 2,804,530 | 8/1957 | McGuinness | 99/379 X |
| 3,083,651 | 4/1963 | Cooper | 99/375 X |
| 4,484,516 | 11/1984 | Bimman | 99/349 |
| 4,586,428 | 5/1986 | Adamson | 99/349 X |
| 4,635,538 | 1/1987 | Polster | 99/422 X |
| 4,669,373 | 6/1987 | Weimer et al. | 99/372 X |
| 4,763,571 | 8/1988 | Bergling et al. | 99/372 X |

FOREIGN PATENT DOCUMENTS 557174  5/1957  Belgium ................. 99/381

Primary Examiner—Stephen Marcus
Assistant Examiner—Christine A. Peterson
Attorney, Agent, or Firm—Ilya Zborovsky

[57] ABSTRACT

A cooking apparatus has two plates which apply heat and pressure to cook an initial food material, wherein one plate is movable toward the other plate manually to close a cooking space, then is moved by a drive to apply a pressure to the food material, and is urged to an open position by a spring.

16 Claims, 7 Drawing Sheets

APPARATUS FOR COOKING FOOD

BACKGROUND OF THE INVENTION

The present invention relates to an apparatus for cooking food.

Apparatuses for cooking food are widely used and based on various principles. One of the known apparatuses is disclosed in the U.S. Pat. No. 4,627,336 and includes two plates which are heated and of which one plate is movable relative to the other plate so as to apply simultaneously heat and pressure to an initial food material. In this apparatus the speed of cooking is extremely high and generally varies between 0.5 and 5 min. Also, taste and quality of final products cooked in the apparatus are very high. The above described cooking apparatus can be further improved in the sense of its performance.

SUMMARY OF THE INVENTION

Accordingly, it is an object of the present invention to provide a cooking apparatus which is an improvement of apparatuses of the above mentioned type.

In keeping with these objects and with others which will become apparent hereinafter, one feature of the present invention resides, briefly stated, in a cooking apparatus having two heated plates, in which manual means is provided for closing the apparatus, drive means is provided for moving one plate toward the other and applying pressure to an initial food material, and urging spring means is provided for opening the apparatus after cooking.

The novel features of the present invention are set forth in particular in the appended claims. The invention itself, however, will be best understood from the following description of preferred embodiments, which is accompanied by the following drawings.

DESCRIPTION OF PREFERRED EMBODIMENTS

Figure 1:
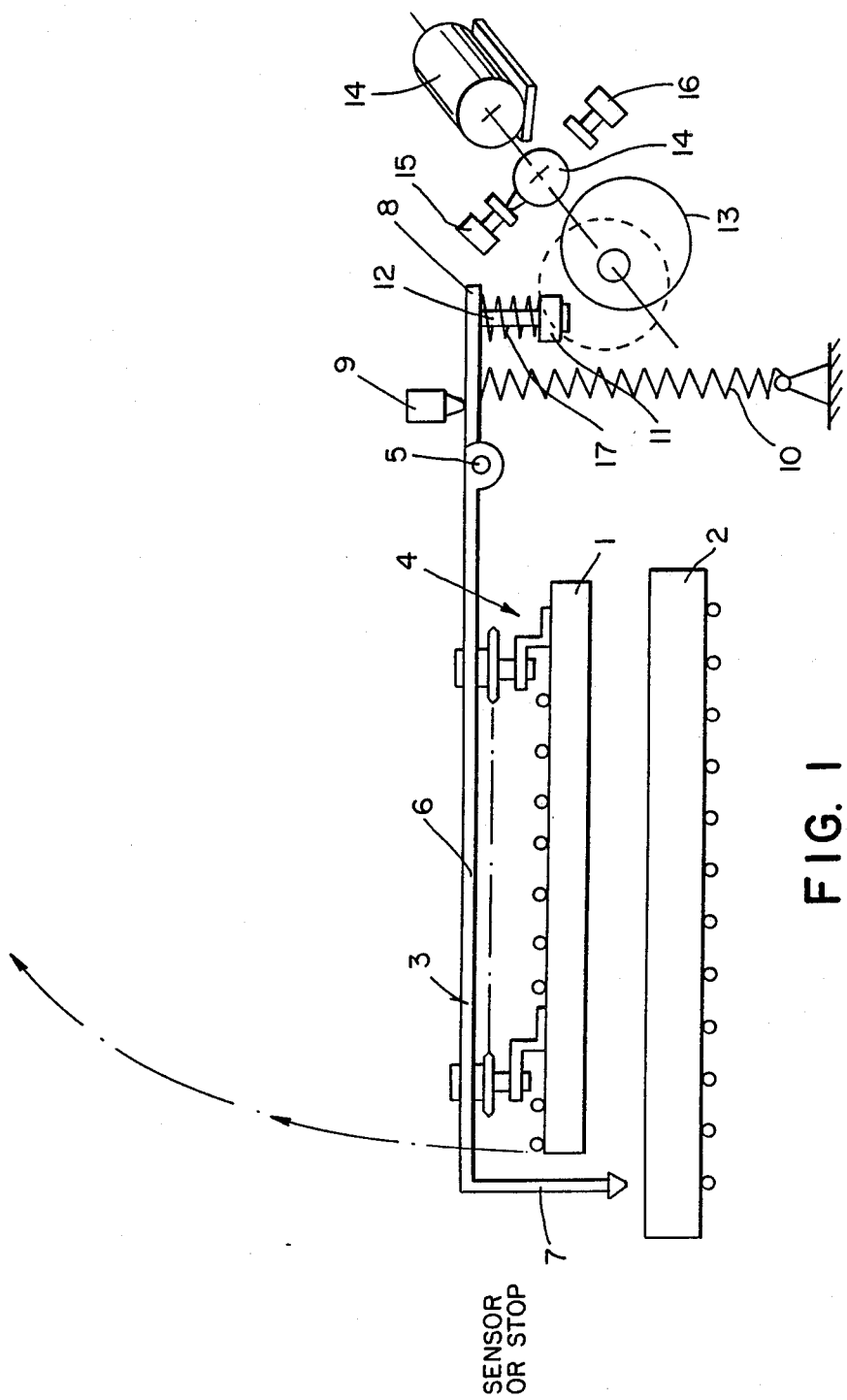
FIG. 1 is a view which schematically shows a cooking apparatus in accordance with the present invention.

A cooking apparatus shown in FIG. 1 has an upper plate 1 and a lower plate 2 provided with heaters. The upper plate 1 is supported in a housing 3 and can be adjusted relative to the housing by an adjusting mechanism 4, so that a final distance between the upper plate 1 and the lower plate 2 during cooking can be changed for applying a desired pressure to an initial food material. The housing is turnable about a pivot point 5. Its one arm 6 is provided with a limiting wall 7, while its other arm 8 is associated with an end switch 9 and connected with a spring 10 which pulls the housing in clockwise direction to an open position in which the housing and the upper plate 1 are located far from the lower plate 2 and the apparatus is open for introducing an initial food material or removing a cooked product.

A spring-biased abutment 11 slides over a pin 12 connected with the arm 8 of the housing and is spring-biased by a spring 17. The abutment 11 cooperates with a cam 13 which is driven in rotation by an electric motor 14. A shaped disc 14 is supported on the shaft of the motor and cooperates with two end switches 15 and 16 arranged at both sides of the disc and diametrically opposite to one another.

The cooking apparatus in accordance with the present invention operates in the following manner. A user places an initial food material onto the lower plate 2 and turns the housing with the upper plate 1 in counterclockwise direction so that the plate 1 becomes close to the plate 2. The arm 8 of the housing activates the end switch 9 and it energizes the motor 14. The motor turns the cam 13 from the position shown in solid lines to the position shown in broken lines, so that the abutment 11 is pushed upwardly by the cam 13 and through its spring 17 arranged on the pin 12, finally presses the housing in counterclockwise direction to produce a short and powerful stroke of the housing with the upper plate 1 toward the lower plate 2, so as to provide a contact with the initial food material by the upper plate and/or apply a pressure by the upper plate to the initial food msterial. At that moment, the shaped disc acts on the switch 16 which stops the motor 14.

When the cooking time elapses, a timer sends a signal to the motor 14 and the latter turns the cam from the position shown in the broken line to the position shown in solid line, thus releasing the abutment 11. The spring 10 pulls the housing with the upper plate 1 in clockwise direction, to open the apparatus. When the disc 14 turns during this turning and cooperates with the end switch 15.

Figure 2:
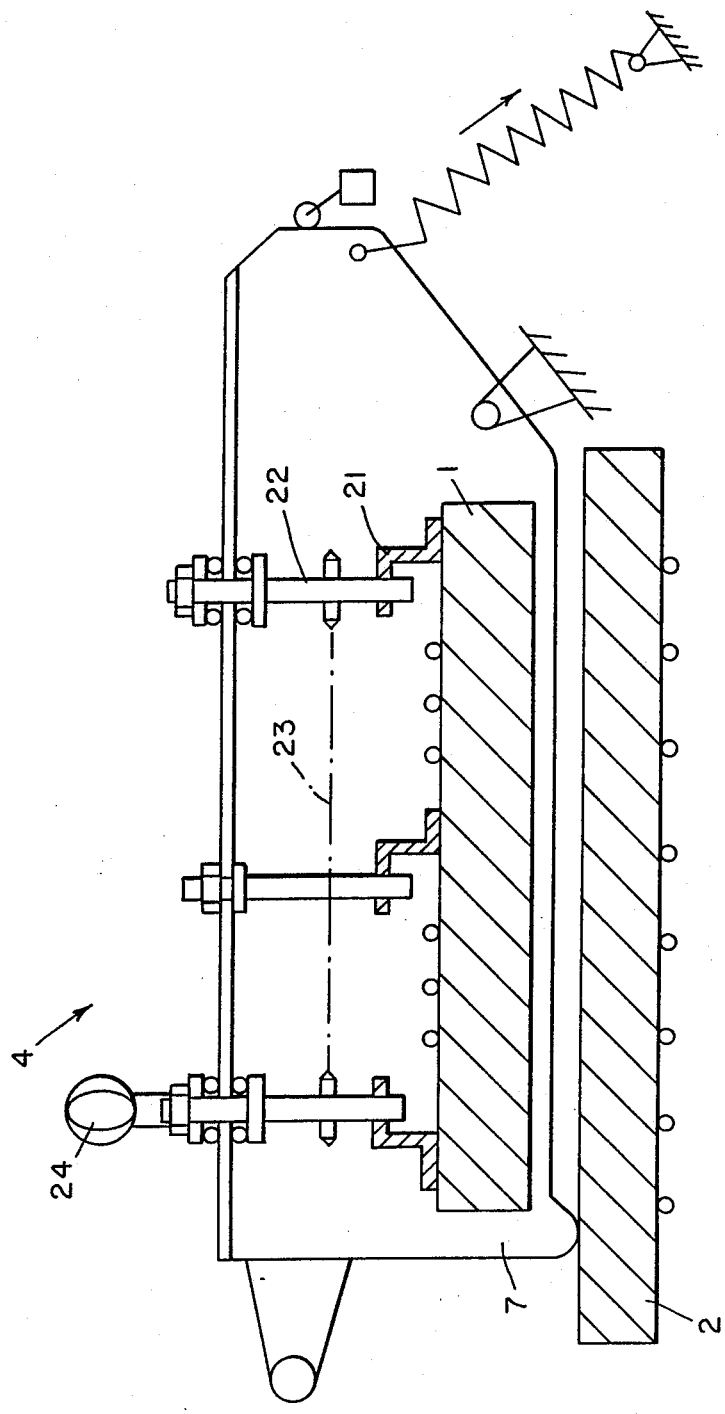
FIG. 2 is a view which shows a mechanism for adjusting a final pressure applied to an initial food material before actual cooking by adjusting a distance between two plates of the apparatus.

FIG. 2 shows the adjusting mechanism of the apparatus of FIG. 1 for adjusting the final thickness between the plates and therefore also a pressure applied to the initial food material. The adjustment with the adjusting mechanism is performed before actual cooking in the apparatus of FIG. 1. The housing of the upper plate in the closed position of the apparatus abuts with its limiting wall 7 against the lower plate, to close the cooking space and to prevent accidental entrapment in the cooking space of hands or other objects. The upper plate is provided with a plurality of fixed nuts 21. Screws or other threaded members 22 extend through the nuts in engagement therewith and are connected with each other by a chain 23. The screws are supported in the upper wall of the housing in a rotatable and non-displaceable manner, for example by bearings. One of the screws is provided with a handle 24.

By turning the handle 24, one of the screws which is connected with the handle is turned and turns the other screws through the chain 23. The screws 22 rotate in the nuts 21 and displace them up or down so that the upper plate also displaces up or down for changing its distance from the upper wall of the housing and therefore also the final distance to the lower plate 2.

Figure 3:
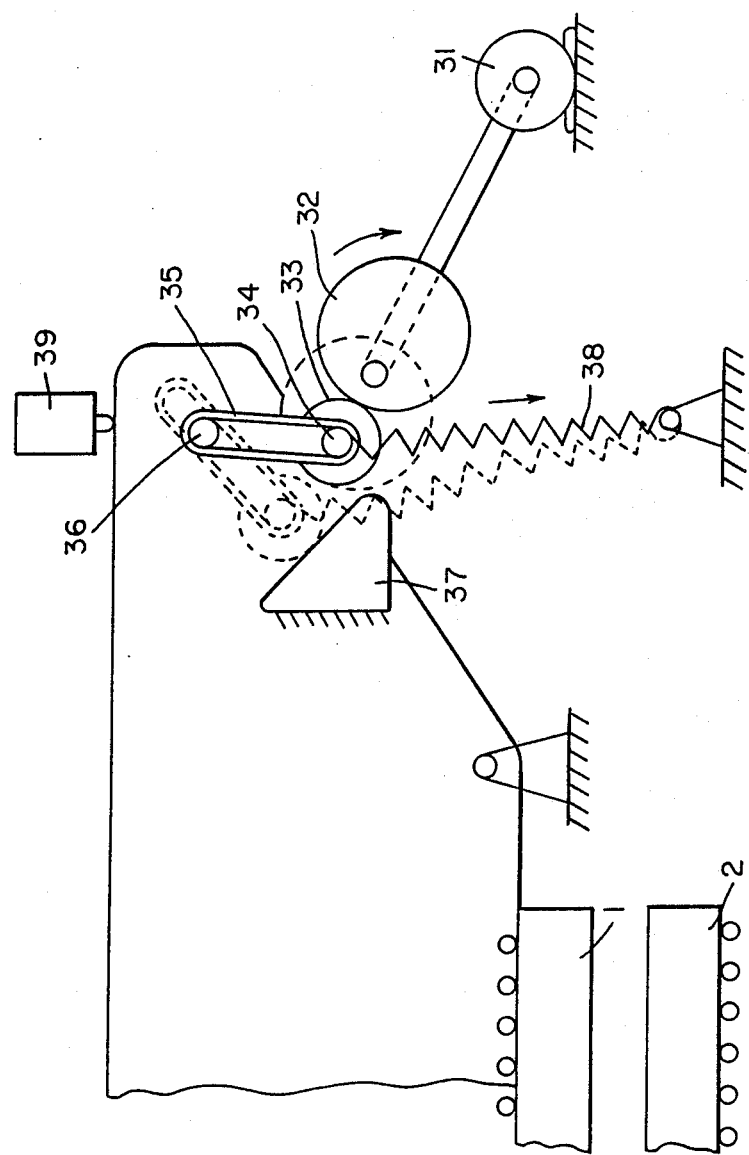
FIGS. 3 and 4 are views which show two further modifications of the cooking apparatus of the invention.

In the embodiment of FIG. 3 the final short and powerful stroke of the upper plate 1 is performed by the weight of this plate. The apparatus is provided with an electric motor 31 which turns a cam 32. The latter cooperates with a roller 33 which carries a pin 34. A loopshaped link 35 sits on the pin 34 and also on another pin 36 which is connected with the housing of the upper plate in a non-displaceable manner. The apparatus is provided with a stationary inclined surface 37. A spring 38 pulls the housing in clockwise direction to an open position.

For cooking, a user turns the housing with the upper plate 1 in counterclockwise direction so that they assume a position which is close to the lower plate 2. In this position the right arm of the housing activates the end switch 39 and the latter energizes the motor 31. The motor turns the cam 32 from its position shown in solid line to its position shown in broken line, so that it pushes the roller 33 onto the inclined surface 37 and the link 35 assumes a position shown in broken line. The spring 38 is connected with the pin 34, and therefore when the roller 33 which carries the pin 34, is on the inclined surface 37, the spring 38 becomes relaxed and releases the housing of the upper plate 1 which then presses with its full weight onto the initial food material supported on the lower plate.

When the cooking time elapses, a timer sends a signal to the motor, and the latter turns the cam 32 further in clockwise direction to the position shown in solid lines. The spring 38 pulls the housing with the upper plate in clockwise direction to its open position, and the roller 33 with the pin 34 and the link 35 return to their initial position.

Figure 4:
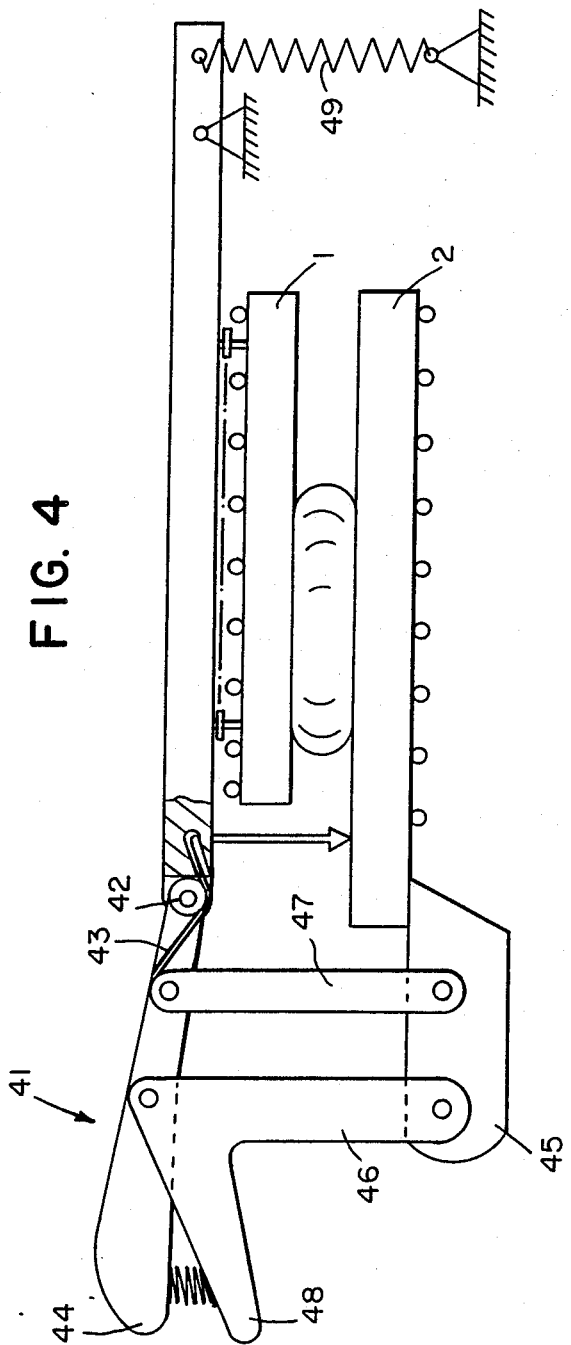

In the embodiment of FIG. 4 the housing of the upper plate is turnably connected with a handle 41 through a pivot point 42 and a tension spring 43. The handle 41 has two substantially horizintal members 44 and 45 connected by two substantially vertical members 46 and 47 in a pivotable manner, and a spring is arranged between a bend 48 of the vertical member 46, and the end of the horizontal member 44.

For cooking, a user turns the housing with the upper plate 1 in counterclockwise direction toward the lower plate to assume a position which is close to the lower plate. Then he applies a slight pressure to the handle 41 at its left end. Since the handle is formed as a lever, even a small pressure applied by a user applies a high pressure to the housing and the upper plate and therefore to the initial food material, for cooking the latter under pressure. During this pressure application by a user onto the handle 41, the lower horizontal member 45 engages with its right end under the edge of the lower plate 2 and maintains the plates in the closed condition during cooking.

After the cooking has finished, a user presses the bend 48 of the member 46 upwardly toward the member 45, the members 46 and 47 are inclined, and the right end of the member 45 disengages from the lower plate 2. Since during the application of pressure to the handle in the initial step for engaging the member 45 with the lower plate 2 the torsion spring 43 was tensioned, therefore after the release of the right end of the member 45 from the edge of the lower plate 2 the torsion spring pulls the handle away of the plate 2. A spring 49 connected with the right arm of the housing of the upper plate then pulls the housing in clockwise direction, so that the housing and the upper plate move away of the lower plate 2 to open the apparatus for removing of the cooked product.

Figure 5:
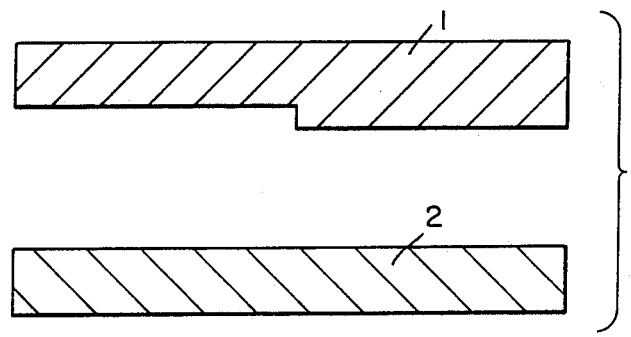

FIG. 5 shows a further modification of the cooking apparatus in accordance with the present invention. In this embodiment the upper plate 1 and the lower plate 2 have different shapes or constructions. It has been recognized from practical experience that it is advisable to cook in the same apparatus and at the same time several different products. For example, based on the demand by the customers, it can be necessary to cook simultaneously two different products, for example a hamburger and a chicken part. It can be also necessary to cook basically the same product, but to provide different final thicknesses related for example to different degrees of cooking. It has been found for example that a higher compression of an initial food material during cooking can result in a faster cooking. This means that with the same cooking time, for example a streak which has been subjected to a lower compression will be less "done", while a steak which has been subjected during cooking to a higher compression than the first steak will be more "done". For cooking two different products or final foods, one of the plates, for example the upper plate 1 has a step which subdivides the lower surface of the upper plate into two surface portions 31 and 32 vertically offset relative to one another. When for cooking the upper plate is displaced toward the lower plate to confine an initial food product therebetween and to cook it, two gaps 33 and 34 of different thicknesses are formed between the plates, so that two different products can be cooked between the plates.

Figure 6:
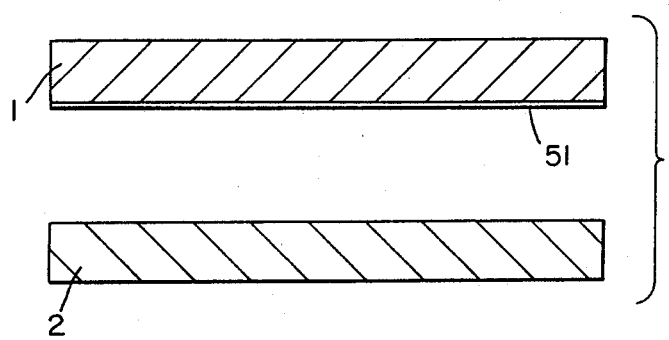
FIGS. 5 and 6 show two modifications of the plate of the cooking apparatus in accordance with the present invention.

Still another embodiment of the present invention is shown in FIG. 6. It has been found that during cooking between the plates the grave problem is sticking of the food material to the plates, which requires frequent cleaning of the plates leading to labor consumption and wear of the plates, and often destroys the food since its surfaces stick to the plates. It has been further found that the sticking in much higher to the upper plate, and even in the event if the surfaces of the plates are made of a material which possesses high antisticking properties, the food products stick to the upper plate and the product is often destroyed by being torn apart. In accordance with the present invention, the upper plate 1 is composed of a material which has a higher anti-sticking property than the lower plate 2. When the apparatus is designed in accordance with this feature, the predominant sticking to the upper plate is eliminated in a surprising manner. The plates thus can be made as follows: the upper plate has an additional sheet 51 of Teflon and the lower plate is composed of a cast iron, the upper plate is Teflon-coated and the lower plate is composed of a stainless steel, the upper plate is composed of a nitrided stainless steel and the lower plate is composed of a cast iron, etc.

Figure 8:
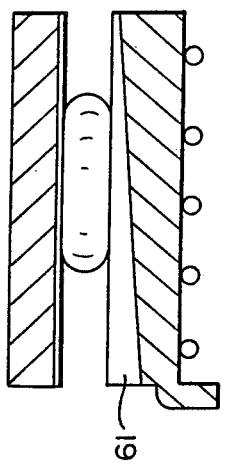
FIGS. 7 and 8 show another modification of the plate of the cooking apparatus in accordance with the present invention.
Figure 7:
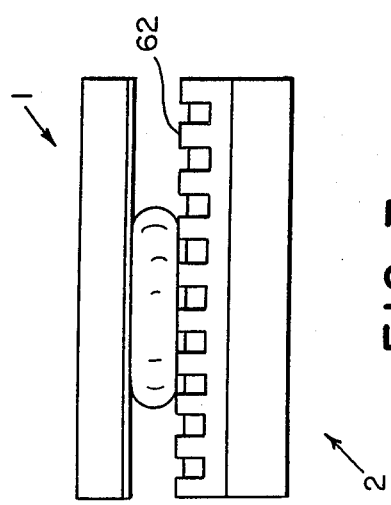

In FIGS. 7 and 8, a further modification of the lower plate 2 is illustrated. The lower plate 2 or more particularly its upper surface is provided with a plurality of grooves 61 which form a plurality of partitions 62 therebetween. The grooves-partitions structure of the upper surface of the lower plate 2 allows flowing of juices during cooking into the grooves on the one hand, and provides on the lower surface of the cooked product such as a hamburger a grate pattern by the partitions. The grate pattern is attractive to many people as reminding a grate pattern of the food cooked on a grate-shaped grill. As can be seen from FIG. 8, the grooves 61 are inclined, so that the juices and the like flow under the action of gravity toward one side of the lower plate, to be removed there. This inclination also facilitates the eventually desirable cleaning of the grooves after a certain time of using the apparatus.

Figure 1A:
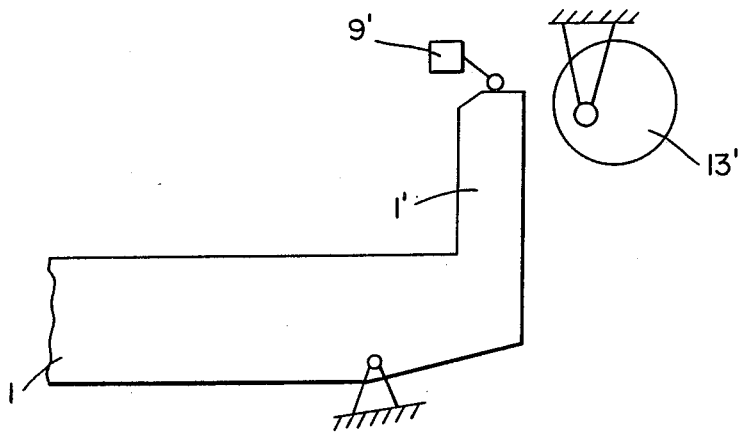
FIG. 1a shows its modification.

FIG. 1a is a modification of the cooking apparatus of FIG. 1a. Here the upper plate 1 has a vertically extending projection 1' which cooperates with a cam 13' and the switch 9'.

The invention is not limited to the details shown since various modifications and structural changes are possible without departing in any way from the spirit of the present invention.

What is desired to be protected by Letters Patent is set forth in the appended claims.

I claim:

1. A cookingapparatus for cooking food, comprising at least two plates arranged to confine an initial food material therebetween and to cook the same, said plates including a lower stationary plate and an upper pivotable plate;
heating means arranged to heat said plates;
manual means for moving said upper plate manually toward said lower plate so as to bring said upper plate close to said lower plate;
drive means for driving said upper plate over a short and powerful stroke after said bringing toward said lower plate to apply not only heat but also pressure to the initial food material for cooking; and
sensing means for sensing a moment when said upper plate has been brought close to said lower plate and at said moment activating said drive means for driving said upper plate after said bringing toward said lower plate over said short and powerful stroke to apply not only heat but also pressure to the initial food material for cooking.

2. A cooking apparatus as defined in claim 1; and further comprising means for urging said upper plate away of said lower plate after cooking and formed as spring means, and a support which is pivotable about a pivot axis and has one arm connected with said upper plate and another arm connected with said spring means and cooperating with said drive means so that said spring means turn said support with said upper plate in one direction, while said drive means turn said support with said upper plate in another direction which is opposite to said one direction.

3. A cooking apparatus as defined in claim 2, wherein said drive means includes a cam which is arranged to rotate and cooperate with said other arm of said support.

4. A cooking apparatus as defined in claim 3, wherein said drive means further include a spring associated with said other arm of said support, so that said cam acts on said support with compression of said spring to provide a reliable movement of said upper plate supported by said support, toward said lower plate.

5. A cooking apparatus as defined in claim 3, wherein said drive means includes a link which is connected with said spring means and also turnably connected with said other arm of said support, said cam being arranged so that it acts on said link so as to turn it and to remove urging of said other arm by said spring means, so that a weight of the support with said upper plate then moves said upper plate toward said lower plate.

6. A cooking apparatus as defined in claim 5; and further comprising an inclined surface cooperating with said link so that when said cam acts on said link, the latter moves onto said inclined surface and is therefore turned to remove urging of said arm by said spring means.

7. A cooking apparatus as defined in claim 1, wherein said drive means include a handle having a lower member arranged to engage under the lower plate, and upper member arranged to be grasped by a user, and a torsion spring arranged between said upper member and said upper plate.

8. A cooking apparatus as defined in claim 7, wherein said upper member of said handle is formed as a lever which amplifies a force applied by a user so as to apply a pressure to said upper plate and thereby the pressure by said upper plate to the initial food material.

9. A cooking apparatus as defined in claim 1; and further comprising means for adjusting a final pressure applied by said plates to the initial food material by adjusting a final distance between said plates, said adjusting means including a support associated with said upper plate and connected with said drive, a plurality of nuts attached to said upper plate, and a plurality of threaded pins connected with one another for joint rotation and arranged in said support in rotatable and not displaceable manner so as to engage in said nuts, one of said threaded pin being turnable by a user.

10. A cooking apparatus as defibed in claim 9; and further comprising means for connecting said threaded pins with one another for joint rotation therewith and including a chain; and a handle connected with said one pin and turnable by a userso as to turn said one pin and thereby to also turn all other pins for displacing said one plate relative to said support and thereby relative to the other plate.

11. A cooking apparatus as defined in claim 1, wherein each of said plates has a cooking surface facing toward an opposite one of said plates, said cooking surface of said upper plate possessing higher food anti-sticking property than said lower plate so as to prevent different sticking of the final cooked product to said plates.

12. A cooking apparatus as defined in claim 1, wherein each of said plates has a cooking surface which faces toward an opposite one of said plates, said cooking surface of at least one of said plates being stepped so that when said one plate has been moved toward said other plate for cooking, at least two spaces of different heights are formed therebetween, to cook different products in said two spaces.

13. A cooking apparatus as defined in claim 1, wherein at least one of said plates has a cooking surface which is provided with a plurality of grooves and projections so as to provide a receptacle for flow of juices by said grooves and to produce a grate-like pattern on the final cooked products by said projections.

14. A cooking apparatus as defined in claim 13, wherein said groove have bottoms which are inclined toward one side of said one plate so as to produce a natural flow of juices in said grooves toward said one side of said one plate.

15. A cooking apparatus as defined in claim 1, wherein said upper plate is formed as a unit including an upper plate member and a support connected with the latter, said upper plate being pivotable about a pivot axis and having one arm arranged to be located above said lower plate during cooking and another arm, said sensing means being located in the region of the other arm so that when said one arm has been brought close to said lower plate said other arm acts on said sensing means and thereby said sensing means activate said drive means.

16. A cooking apparatus as defined in claim 15, wherein said support is provided with said one arm and said other arm, said one arm of said support carrying said upper plate member, said other arm of said support being located in the region of said sensing means so as to act on the latter when said one arm with said upper plate member has been brought close to said lower plate.

* * * * *